United States Patent
Kumagai et al.

(10) Patent No.: US 7,061,676 B2
(45) Date of Patent: *Jun. 13, 2006

(54) REAR PROJECTION SCREEN AND REAR PROJECTION DISPLAY APPARATUS

(75) Inventors: Yoshihiro Kumagai, Kitakanbara-gun (JP); Ichiro Matsuzaki, Tsukuba (JP)

(73) Assignee: Kuraray Co., Ltd., Kurashiki (JP)

( * ) Notice: Subject to any disclaimer, the term of this patent is extended or adjusted under 35 U.S.C. 154(b) by 61 days.

This patent is subject to a terminal disclaimer.

(21) Appl. No.: 10/769,914

(22) Filed: Feb. 3, 2004

(65) Prior Publication Data

US 2004/0156103 A1    Aug. 12, 2004

(30) Foreign Application Priority Data

Feb. 4, 2003    (JP) ............................. 2003-027354

(51) Int. Cl.
*G02B 3/08* (2006.01)
*G03B 21/60* (2006.01)

(52) U.S. Cl. ...................................... 359/457; 359/742
(58) Field of Classification Search ................ 359/443, 359/446, 452–457, 460, 742
See application file for complete search history.

(56) References Cited

U.S. PATENT DOCUMENTS

| 2,618,198 | A | | 11/1952 | Luboshez ................... 359/456 |
| 5,513,036 | A | * | 4/1996 | Watanabe et al. ........... 359/457 |
| 6,292,295 | B1 | | 9/2001 | Yamashita et al. .......... 359/460 |
| 2002/0149846 | A1 | * | 10/2002 | Goto et al. .................. 359/456 |

FOREIGN PATENT DOCUMENTS

JP    8-101459    *  4/1996

OTHER PUBLICATIONS

Translation of JP8-101459, Derwent Machine-Assisted translation, Mar. 17, 2005.*

* cited by examiner

*Primary Examiner*—W. B. Perkey
*Assistant Examiner*—Andrew Sever
(74) *Attorney, Agent, or Firm*—Oblon, Spivak, McClelland, Maier & Neustadt, P.C.

(57) ABSTRACT

A rear projection screen for use in a rear projection display apparatus contains a Fresnel lens sheet, a horizontal lenticular lens sheet capable of horizontally refracting the incident light, and a vertical lenticular lens sheet capable of vertically refracting the incident light, in this order from the incident side of the incident light, in which the lens center of the Fresnel lens sheet is arranged upward with respect to the mechanical center of the screen, and, in relation to this arrangement, black stripes of the vertical lenticular lens sheet are shifted with respect to the vertical lenticular lens.

11 Claims, 7 Drawing Sheets

BACKGROUND ART

BACKGROUND ART

BACKGROUND ART

BACKGROUND ART

REAR PROJECTION SCREEN AND REAR PROJECTION DISPLAY APPARATUS

BACKGROUND OF THE INVENTION

1. Field of the Invention

The present invention relates to a rear projection screen for use in a rear projection display apparatus which serves to enlarge and project an image on a screen to be observed from the front side, such as a CRT, a liquid crystal panel or a digital mirror device in which the angle of a fine mirror is controlled based on an image signal and the reflected light reflected by the mirror is used. More specifically, it relates to a rear projection screen that can inhibit a deceased contrast caused by external light, which decreased contrast is a problem in rear projection display apparatus of this type.

2. Description of the Related Art

Conventional rear projection screens for use in rear projection display apparatus generally comprise two lens sheets including a Fresnel lens sheet and a horizontal lenticular lens sheet containing a light-diffusing member. However, these rear projection screens invite decreased contrast of the screen because external light from lighting at the ceiling of a room or light reflected from surrounding walls is scattered and reflected at the surface of the screen.

To prevent the reflection of the incident external light and to improve the image contrast, a screen having three sheets including two lenticular lens sheets arranged in a perpendicular direction to each other has been proposed. This type of screens can be found in, for example, Japanese Unexamined Patent Application Publications No 07-5573 and No. 08-101459. In these screens, the ratio of black stripes can be substantially increased and the contrast can be improved by using the lenticular lens sheets arranged in a perpendicular direction to each other.

However, in a screen shown in FIG. 6 including, from a projector side in this order, a Fresnel lens sheet, a vertical lenticular lens sheet and a horizontal lenticular lens sheet, the incident light is reflected at the surface of the vertical lenticular lens and emerges as stray light toward a viewer, thereby causing image deterioration. In a screen shown in FIG. 7 including, from a projector side, a Fresnel lens sheet, a horizontal lenticular lens sheet and a vertical lenticular lens sheet in this order, light from a light source positioned above the viewer, such as lighting, undergoes retroreflection from the lenticular lens on the light source side of the vertical lenticular lens sheet and on the incident-emergent surface of the other lens sheets and appears as stray light, thereby deteriorating the image contrast and decreasing the image quality.

SUMMARY OF THE INVENTION

Accordingly, an object of the present invention is to solve the above problems while keeping high contrast performance.

Specifically, the present invention provides, in an aspect, a rear projection screen for use in a rear projection display apparatus, containing at least three lens sheets including a Fresnel lens sheet, a horizontal lenticular lens sheet capable of horizontally refracting the incident light, and a vertical lenticular lens sheet capable of vertically refracting the incident light, in this order from the incident side of the incident light, the vertical lenticular lens sheet having a lenticular lens on its incident surface and black stripes in the vicinity of the focus of the lenticular lens in portions where the incident light does not pass through, wherein the lens center of the Fresnel lens sheet is arranged upward with respect to the mechanical center of the screen, and, in relation to this arrangement, the black stripes of the vertical lenticular lens sheet are shifted with respect to the vertical lenticular lens.

The present invention provides, in another aspect, a rear projection display apparatus having the rear projection screen.

The rear projection screen of the present invention has a high contrast, can prevent stray light due to external light such as lighting and can provide a high-quality image display.

Further objects, features and advantages of the present invention will become apparent from the following description of the preferred embodiments with reference to the attached drawings.

BEST MODE FOR CARRYING OUT THE INVENTION

Figure 1:
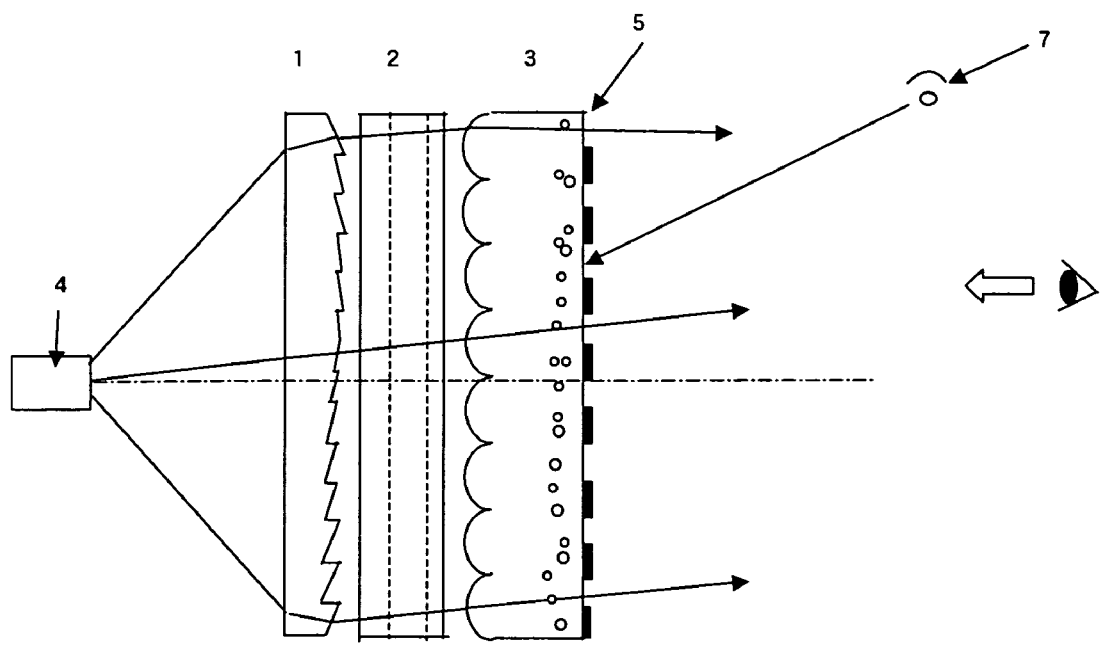
FIG. 1 is a diagram showing the light path in a rear projection screen as an embodiment of the present invention.

FIG. 1 illustrates a rear projection screen as an embodiment of the present invention. The screen comprises a Fresnel lens sheet 1, a horizontal lenticular lens sheet 2 and a vertical lenticular lens sheet 3 in this order from the incident side of incident light. The Fresnel lens sheet 1 has a Fresnel lens center upward with respect to the mechanical center of the screen; the vertical lenticular lens sheet 3 has a lenticular lens on the incident side for vertically refracting the incident light and black stripe 5 at the focus of the lenticular lens in portions where the incident light does not pass through, and the black stripes 5 are shifted with respect to the lenticular lens.

Figure 2:
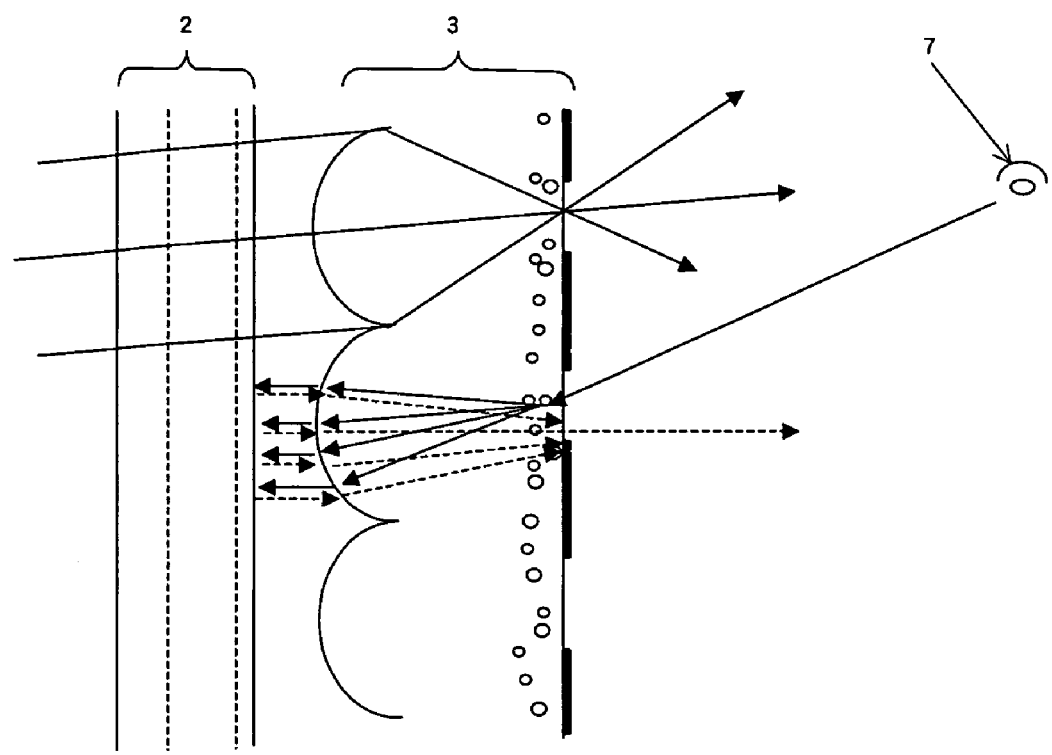
FIGS. 2, 3A and 3B each illustrates how the present invention operates.
Figure 4:
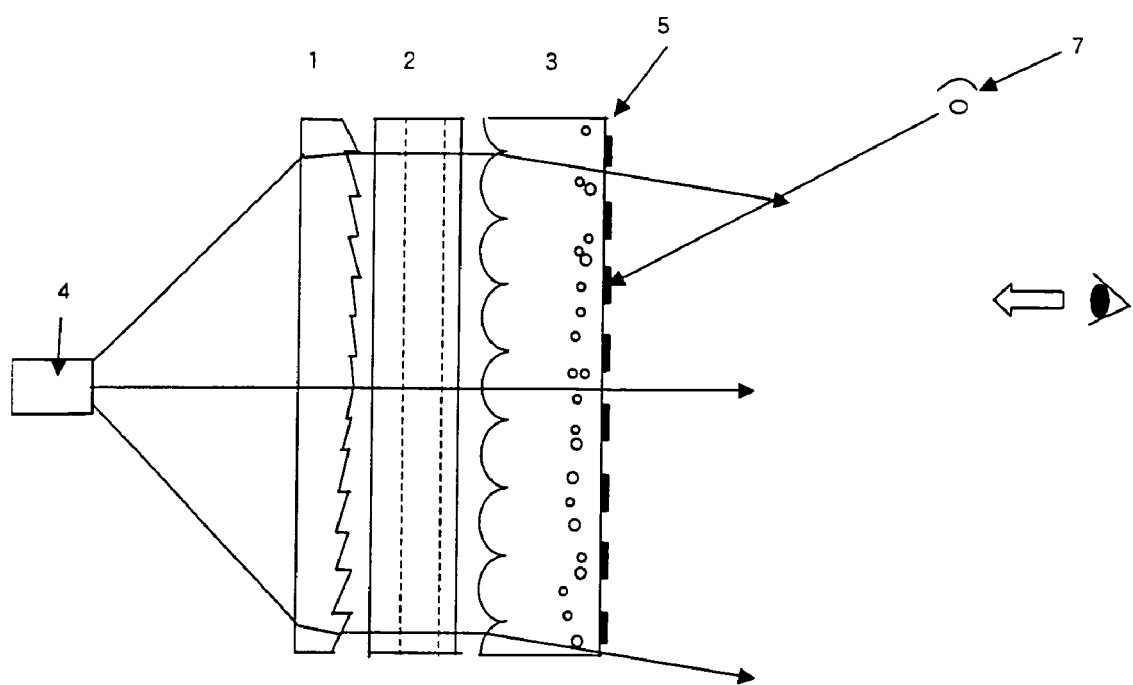
FIGS. 4 and 5 each illustrates the light path in a conventional rear projection screen.
Figure 5:
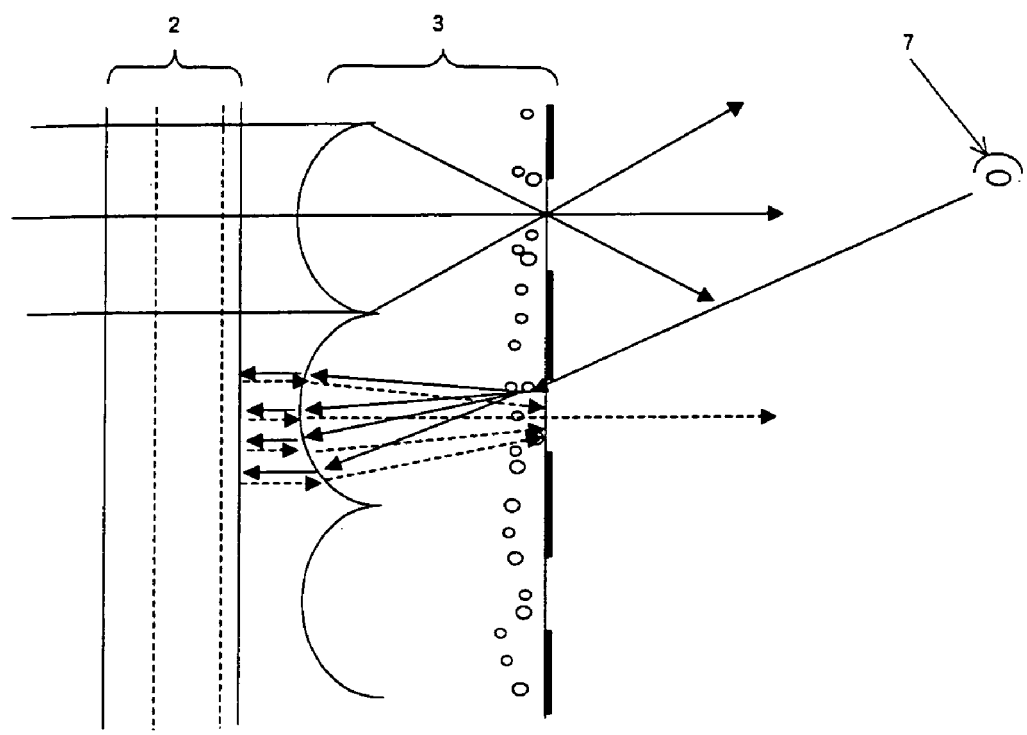
Figure 6:
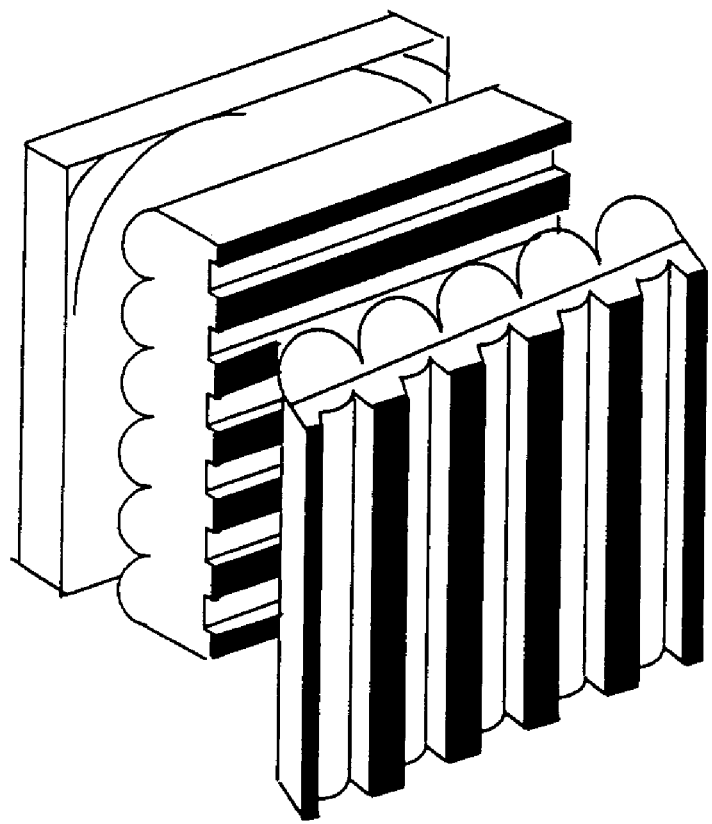
FIGS. 6 and 7 each illustrates conventional rear projection screen.
Figure 7:
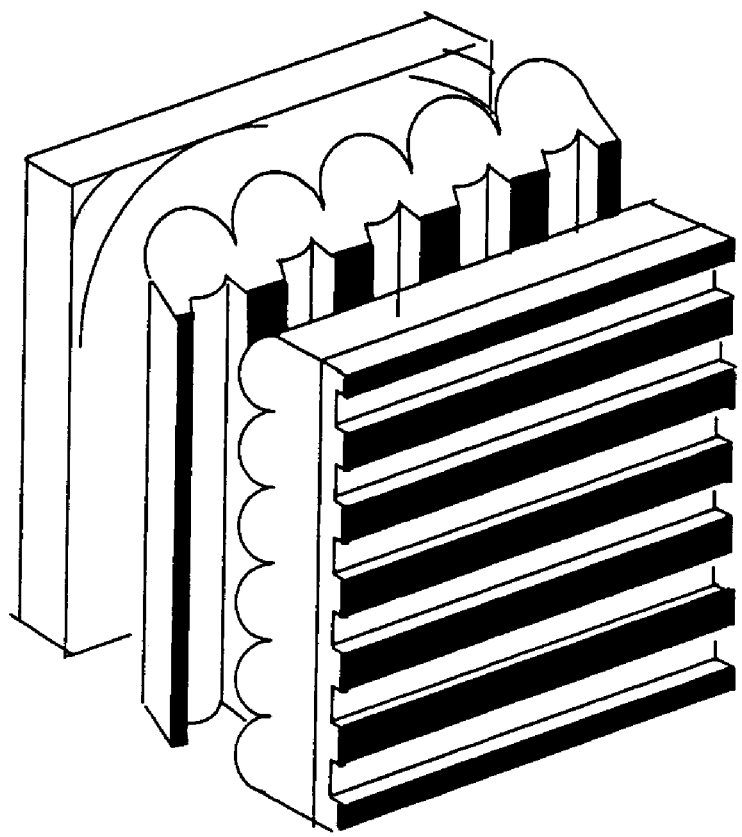

FIG. 2 is a vertical sectional view showing the course of external light rays in the rear projection screen of this embodiment. FIG. 4 illustrates a conventional rear projection screen for comparison, and FIG. 5 is a vertical sectional view of the course of external light rays in the screen of FIG. 4.

The external light coming into the rear projection screen comes into the light-diffusing member in the vicinity of the focus of the lenticular lens of the vertical lenticular lens sheet 3 and diffuses toward the inner surface of the vertical lenticular lens sheet 3. The external light reflected at the inner surface returns to the incident side and emerges toward the viewer from portions where the black stripes 5 are absent. The residual external light passing through the vertical lenticular lens 3 comes into and is reflected by the horizontal lenticular lens 2, comes into the vertical lenticular lens and emerges toward the viewer from portions where the black stripes 5 are absent. By shifting the black stripes 5 upward with respect to the screen as illustrated in FIG. 2, the ratio of the reflected external light absorbed by the black stripes 5 becomes higher than the conventional screen shown in FIG. 5, thus improving the image contrast. The screen of the present invention where the black stripes are shifted upward exhibits similar advantages of reducing the stray light even when the vertical lenticular lens sheet does not contain a light-diffusing member, since a larger part of the external light rays go downward in this case.

Figure 3A:
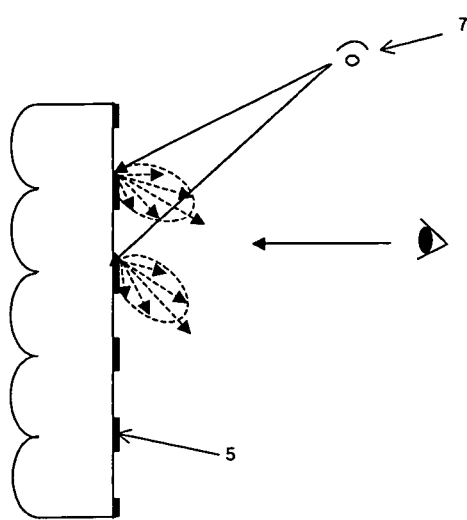
Figure 3B:
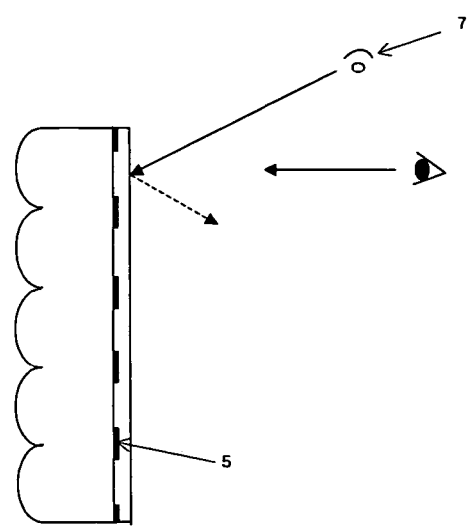

When a rear projection screen having a vertical lenticular lens sheet arranged on the viewer side is used, part of the external light coming into the rear projection screen from the luminaire 7 such as a ceiling fluorescent lamp is scattered and reflected in the vertical direction by black stripes arranged on the viewer side of the vertical lenticular lens sheet (FIG. 3A). As a result, an image of the luminaire 7, which is vertically elongated, reaches the viewer, leading to a deteriorated image quality. This problem can be avoided in the rear projection screen of the present invention by making the viewer side of the vertical lenticular lens sheet 3 a flat surface 6 (FIG. 3B). The viewer side of the vertical lenticular lens sheet can be flattened, for example, by coating with a transparent coating agent or by adhering a resin sheet or film having a flat surface with the lens sheet without the interposition of an air space using a transparent adhesive. For better contrast, the flat surface is preferably a mirror-finished surface. However, even when the flat surface is an anisotropically scattering surface by means of, for example, a light-diffusing member or embossing, the above advantages can be obtained, since unnatural reflection elongated only in the vertical direction can be avoided.

The vertical lenticular lens sheet for use in the present invention may have any pitch, focal length of the lens and ratio of the width of black stripe to the lenticular lens pitch ("black stripe ratio"). However, for satisfactory diffusing properties and contrast, the ratio of the focal length of the lenticular lens to the lenticular lens pitch (focal length/lenticular lens pitch) is preferably in a range from 1.3 to 3.0 and the black stripe ratio is preferably in a range from 60% to 80% and more preferably from 70% to 80%. In the use of a rear projection display apparatus, which displays images using fine pixels, such as a liquid crystal panel, the lenticular lens pitch is preferably 0.5 mm or less and more preferably 0.3 mm or less for reducing moire caused by the interference between the pixels and the lenses having different pitches.

The vertical lenticular lens sheet may partially include a layer containing a light-diffusing member. This configuration can reduce the moire caused by the interference among the individual lens sheets having different pitches but leads to a decreased brightness of the screen and should be determined according to necessity. Where necessary, the vertical lenticular lens sheet may have an antireflective layer on the viewer side for reducing the reflection and may be subjected to hard coating for preventing the damage of the surface.

The lens sheets for use in the present invention can be produced according to a conventional procedure such as 2P (photo-polymer) molding, extrusion molding or pressing.

The present invention will be described in further details with reference to several examples below, which are not intended to limit the scope of the invention.

EXAMPLE 1

FIG. 1 is a vertical sectional view of the light path in the rear projection screen in this example.

The incident light projected from a projector comes into a Fresnel lens sheet 1 and is concentrated toward the viewer side. The incident light then comes into a lenticular lens sheet 2 having lenticular lenses on both sides and is oriented or aligned in the horizontal direction. With reference to FIG. 1, the incident light is not refracted in the vertical direction and travels in a straight line, since the lenticular lens sheet 2 does not include a light-diffusing member. The incident light passes through a vertical lenticular lens sheet 3 and is refracted in the vertical direction. The vertical lenticular lens sheet 3 has lenticular lenses on the projector side for refracting the incident light in the vertical direction and black stripes 5 on the viewer side and includes a light-diffusing member in the vicinity of its outgoing face.

The lens center of the Fresnel lens sheet was shifted upward in the following manner. Specifically, the mechanical position between the projector and the Fresnel lens sheet was set so that the angle between a first line and a second line was 6 degrees, wherein the first line connects between the light-exit point of the projector and the mechanical center of the screen, and the second line connects between the light emergent point of the projector and the center of Fresnel lens. The black stripes 5 of the vertical lenticular lens sheet 3 were arranged at the midpoints between focal positions of adjacent upper and lower hills of vertical lenticular lens in the rear projection screen. The required upward shift of the black stripes at the lens center of the Fresnel lens sheet 1 can be approximately determined by multiplying tangent (6 degrees) by the focal length of the vertical lenticular lenses. At the lens center of the Fresnel lens sheet 1, the incident light coming into the vertical lenticular lenses 3 at an upward angle of 6 degrees is refracted and is broadened in the vertical direction, and the center of its intensity lies at an upward angle of 6 degrees.

The Fresnel lens sheet was produced with 2P molding. The substrates of the horizontal lenticular lens sheet and the vertical lenticular lens sheet were produced by extrusion, and the black stripes were formed with screen-printing. The vertical lenticular lens sheet used herein comprises a lenticular lens having a lens pitch of 0.45 mm and a focal length of 1.09 mm on one side and black stripes having a black stripe ratio of 60% and a height of 55 μm on the outgoing face of the lenticular lens sheet.

The above-prepared rear projection screen was integrated into a commercially available rear-projection television set, was observed under lighting from a ceiling fluorescent light to find that the image was not deteriorated due to stray light and had good appearance.

EXAMPLE 2

A rear projection screen was produced by the procedure of Example 1, except that a layer containing a light-diffusing member was not formed in the vertical lenticular lens sheet. The resulting rear projection screen had similar operation and advantages as the rear projection screen of Example 1.

COMPARATIVE EXAMPLE 1

A rear projection screen was produced by the procedure of Example 1, except that the Fresnel lens center was made agree with the mechanical center of the screen and that the black stripes in the vertical lenticular lens sheet were not shifted (FIG. 4).

The above-prepared rear projection screen was integrated into a commercially available rear-projection television set, was observed under lighting from a ceiling fluorescent light to find that whitish areas probably caused by stray light were observed on the screen.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A rear projection screen for use in a rear projection display apparatus, comprising at least three lens sheets including:
   a Fresnel lens sheet,
   a horizontal lenticular lens sheet configured to horizontally refract an incident light, and
   a vertical lenticular lens sheet configured to vertically refract the incident light, in this order from an incident side of the incident light,
   the vertical lenticular lens sheet including a lenticular lens on an incident surface of the vertical lenticular lens sheet and black stripes in a vicinity of a focus of the vertical lenticular lens in portions where the incident light does not pass through,
   wherein a lens center of the Fresnel lens sheet is arranged upward with respect to a mechanical center of the screen, and, in a relation to this arrangement, the black stripes of the vertical lenticular lens sheet are shifted with respect to the vertical lenticular lens.

2. The rear projection screen according to claim 1, wherein at least one of the Fresnel lens sheet, the horizontal lenticular lens sheet and the vertical lenticular lens sheet includes a layer with a light-diffusing member.

3. The rear projection screen according to claim 1, wherein, in the vertical lenticular lens sheet, the ratio of a focal length of the lenticular lens to a lenticular lens pitch is in a range from 1.3 to 3.0, and the ratio of a width of black stripe to the lenticular lens pitch is in a range from 60% to 80%.

4. A rear projection display apparatus including the rear projection screen of claim 1.

5. The rear projection screen according to claim 1, wherein a viewer side of the vertical lenticular lens sheet has a flat surface.

6. The rear projection screen according to claim 5, wherein the flat surface includes a mirror-finished surface.

7. The rear projection screen according to claim 1, wherein a viewer side of the vertical lenticular lens sheet is covered with at least one of a transparent coating agent or a resin sheet, configured to cover the black stripes.

8. The rear projection screen according to claim 1, wherein the vertical lenticular lens sheet includes an anti-reflective layer.

9. The rear projection screen according to claim 1, wherein the black stripes of the vertical lenticular lens sheet are arranged at midpoints between focal positions of adjacent upper and lower hills of the vertical lenticular lens.

10. The rear projection screen according to claim 1, wherein the relation of the upward shift of the black stripes is determined by an angle formed by a first line along an optical axis of the projector and by a second line from a light-exit point of the projector to the lens center of the Fresnel lens sheet.

11. The rear projection screen according to claim 1, wherein the Fresnel lens sheet and the vertical lenticular lens sheet have shifted optical axes.

* * * * *